United States Patent Office 3,758,376
Patented Sept. 11, 1973

3,758,376
OPAQUE PAPERS AND PHOTOGRAPHIC PAPERS PREPARED THEREFROM
Carol R. Beckner, Watertown, and Klaus B. Kasper, Pulaski, N.Y., assignors to Schoeller Technical Papers, Inc., Pulaski, N.Y.
No Drawing. Continuation-in-part of application Ser. No. 857,237, Sept. 11, 1969. This application June 29, 1970, Ser. No. 50,999
Int. Cl. D21h 3/80, 3/82
U.S. Cl. 162—162
27 Claims

ABSTRACT OF THE DISCLOSURE

Gray opaque papers suitable for use in the photographic art are prepared by adding to a suspension of fibers, prior to forming, a light absorbing colorant, titanium pigment particles and a small amount of colloidal material carrying a surface electrical charge. In such papers, smaller than usual amounts of the light absorbing material are necessary to produce opacity to actinic light. Such papers can be basecoated with a white pigment coating, coated with a diffusion transfer positive emulsion and backcoated with a curl, water and solvent resistant coating to produce a positive print paper for use in pod development in diffusion type photographic processes.

FIELD OF THE INVENTION

This invention relates to the production of novel opaque papers for use in the photographic art and to the production therefrom of photographic print papers useful in diffusion type photographic processes.

This is a continuation-in-part of our U.S. application Ser. No. 857,237, filed Sept. 11, 1969, and now abandoned.

DESCRIPTION OF THE PRIOR ART

Light absorbing colorants, such as water dispersible black pigments or water soluble black dyes, have been added to paper to produce opaque papers for quite some time. The resultant black papers were objectionable for many uses particularly where it was found necessary to apply white pigmented coatings thereto to produce a white surface. Furthermore, the amounts of light absorbing colorant material to produce complete opacity appeared to be excessive.

In diffusion type photographic processes where the photographic print is obtained by pod development outside the camera of the negative in contact with the positive print paper, it is essential that both negative and positive print papers are impervious to actinic light. Additionally, for clarity and definition of the print, it is essential to provide a positive print paper having a white printing surface.

Prior to our invention, positive print paper for the above specified diffusion type photographic process was produced by applying the photographic emulsion to a white photographic paper which has been basecoated with one or two coats of a white pigmented coating, usually a baryta-gelatin coating. The opacity of such paper to actinic light was obtained by backcoating the paper with organic solvent based coatings containing a black, light absorbing material. In many instances, additional white pigmented coatings were applied over the black backcoatings.

Production of such prior art positive print paper was difficult due to the necessity of applying multiple heavy weight coatings. Also, due to the high coating to paper weight ratio, the strength properties of such papers was low.

SUMMARY OF THE INVENTION

In accordance with the practice of this invention, we have found that we can produce a novel gray opaque paper suitable for photographic use using minimal amounts of light absorbing colorants in combination with a light scattering white pigment particles such as titanium pigment particles, and a colloidal material carrying an electrical charge on the surface of the colloid. The light absorbing material, titanium pigment particles, and colloidal materials are all added as water dispersions or solutions to a suspension of photographic papermaking fibers prior to forming the paper web.

The grap opaque paper produced in accordance with the practice of our invention can be coated with a white pigmented coating over which a diffusion transfer positive emulsion can be applied, and a curl, water and solvent resistant backcoating can be applied to the opaque paper to produce a positive print paper for use in external development as exemplified by pod development outside the camera in diffusion type photographic processes.

The novel paper produced in accordance with this invention is essentially opaque even when the amount of light absorbing colorant material is as low as 1.3 grams per square meter of paper. The reason for this is not completely understood. However, it is believed that the light scattering pigment particles by refraction and reflection from their air-particle interfaces thus provide a longer and more diffuse path for the light to travel through the paper and thus more opportunity to be absorbed by the light absorbing colorant material. Additionally, the electrically surface charged colloidal material is known to increase the light scattering efficiency of the titanium pigments.

In the production of the finished positive print paper, the use of the gray opaque paper has the advantage of eliminating the dependency on coatings, particularly backcoatings, to provide the necessary opacity. And the gray appearance reduces the amount of white pigmented coating necessary to produce the required white surface. Thus the number and thickness of such coatings can be reduced, and a positive print paper of proportionately higher strength can be produced due to the higher fiber to coating ratio.

DESCRIPTION OF THE PREFERRED EMBODIMENTS

For purposes of this invention, a paper is defined as being opaque if the paper will not transmit enough light to visibly desensitize a highly sensitive negative emulsion on exposure to light within a given test time. In the performance of this test, the emulsion side of a high speed negative, such as Polaroid 3000 Speed Negative, is covered with the test paper, placed 9 inches from a 375 watt floodlamp and exposed to the light from the lamp for a period of one minute. The thus exposed negative is then kept in the dark until developed and fixed using procedures normal for this type of negative. The test paper is said to be completely opaque if the negative is not visibly darkened and black specks are substantially eliminated.

The light absorbing colorants useful in this invention were found to be water dispersible black pigments or water soluble black dyes. The preferred colorant is a colloidal carbon black pigment. As furnished by the manufacturer, this colorant was a 38% solids colloidal dispersion of carbon black sold by Columbia Carbon Company under the trademark Aquablak "B." It is designated as C.I. Pigment Black 7 (C.I. 77266) in the 1956 Colour Index. Water soluble black dyes have been substituted in whole or in part for the carbon black pigment. A preferred such dye is Nigrosine WSB. It is designated as C.I. Acid Black 2 (C.I. 50420) in the 1956 Colour Index.

The titanium pigments found to be useful in the practice of this invention include both rutile and anastase titanium dioxides and potassium titanate. Mixtures of titanium dioxide and potassum titanate have been found to be particularly useful. The titanium dioxide pigments are those normally used as fillers in paper and generally have an average spherical diameter in the order of 350 millimicrons. The potassium titanate is fibrous in character and pigmentary size. A process for preparing such fibrous titanates is described in U.S. Pat. 3,328,117. A particular fibrous titanate pigment found to be useful had an average particle size 200 millimicrons in diameter and 10 microns in length. Such a pigment is sold by E. I. du Pont de Nemours & Company, Wilmington, Del., under the trade name PKT pigmentary potassium titanate.

At least 10% of the titanium pigment may be replaced by known inexpensive titanium pigment extenders, such as a sodium silico aluminate pigment without noticeably changing the properties of the opaque paper produced.

In order to produce the opaque paper of this invention, it was found necessary to add to the pulp furnish amounts of titanium pigment and light absorbing colorant equivalent to at least 14 grams and 1.3 grams, respectively, per square meter of paper produced. The following Table 1 lists the preferred amounts and usable ranges of opacifying materials per square meter of paper found to be satisfactory, irrespective of the basis weight or thickness of the paper. In determining the amounts necessary, a practical range of papers from 5 to 9 mils thick were made and tested.

TABLE 1

|  | Preferred range | Usable range |
|---|---|---|
| Titanium pigment, grams | 14–17 | 14–26 |
| Light absorbing colorant, grams | 2.5 | 1.3–3.8 |

The preferred electrically charged colloidal material is a hydrous magnesium silicate consisting of rod shaped particles of an average effective spherical diameter of approximately 20 millimicrons and carrying a negative electrical charge on the particle surface. A process for preparing this colloidal magnesium silicate is given in U.S. Pat. 3,458,393. Such a material is sold by FMC Corporation, Philadelphia, Pa., under the trademark designation Avibest C. Another electrically charged colloidal material which has been found to be useful is a hydrous aluminum oxide consisting of particles having an average diameter of approximately 30 millimicrons and carrying a positive electrical charge on the particle surface. Such a colloidal aluminum oxide has been prepared by the hydrolysis of aluminum chloride in a flame resulting in aluminum oxide crystals 90% of which are in the gamma form. It is sold by Cabot Corporation, Boston, Mass., under the trademark Alon C. Addition of these electrically charged colloidal materials at the rate of 1.5 to 15% based on the weight of titanium pigment has been found to be necessary to produce an opaque paper using the ranges of opacifying materials, light absorbing colorants and light scattering pigments, listed in Table 1.

A preferred method of producing the opaque paper of this invention is given in the following example.

Example I

Aqueous dispersions of 2% hydrous magnesium silicate (Avibest) and 50% filler pigments (rutile titanium dioxide pigment containing 10% sodium silico aluminate extender pigment based on the total pigment content) were separately made using a high speed mixer such as Cowles Dispersator. The titanium dioxide dispersion additionally contained 0.3% sodium hexametaphosphate based on the titanium dioxide content to assist in dispersing the pigment particles. The magnesium silicate and titanium dioxide dispersions prepared above were added, in that order, to a 3% suspension of photographic grade sulfite and kraft wood fibers which had been previously refined to a Canadian Freeness of about 350 in amounts equivalent to 0.5% magnesium silicate and 10% combined filler pigments by weight based on fiber content. Prior to formation of the opaque paper on a Fourdrinier machine, 2% cationic starch and about 1% rosin size, both based on the fiber content, and alum to pH of about 4.5 were added to the above combined pulp suspension. 1.5% pre-dispersed carbon black, based on fiber content, was added just after the addition of the cationic starch. The paper web was formed using papermaking techniques known to produce a well-formed paper free from fiber clots and holes, and was pressed and dried in the usual manner. The finished paper was tubsized with 6% oxidized starch and machine calendered to provide a smooth paper for further coating.

The resultant grap paper had a caliper of 7.5 mils; a basis weight of 170 grams per square meter and contained 15.5 grams of filler and 2.1 grams of carbon black per square meter, based on the amount of these materials added. Retention of the filler and other additives was substantially complete since the "white-water" was recirculated. The paper produced was of a uniform gray color and was found to be completely opaque as determined by the aforementioned opacity test.

Example II and III

Additional gray papers similar in appearance to those produced in Example I were produced using the general method of Example I with the exception that the magnesium silicate and titanium dioxide dispersions were mixed together before being added to the suspension of fibers. Additional differences are given in Table 2 as follows:

TABLE 2

|  | Example II | Example III |
|---|---|---|
| Caliper, mils | 7.2 | 7.4 |
| Basis weight, grams per square meter | 166 | 165 |
| Combined filler, grams per square meter | 18.4 | 19.0 |
| Carbon Black, grams per square meter | 2.36 | 2.5 |
| Retention of filler, percent based on ash | 94 | 93 |
| Opacity of paper | Complete | Complete |

Example IV

The 7.5 mil gray paper produced in Example I was coated one side with 50 grams per square meter of an aqueous baryta-titanium dioxide pigmented gelatin coating containing 62 parts titanium dioxide, 38 parts barium sulfate, 10.8 parts gelatin and 6 parts glycerine. The resultant sheet was completely opaque and was white on the coated side with no apparent show through of the gray color of the paper.

Example V

The gray paper of Example II was coated one side in two stages with 45 grams per square meter of an aqueous titanium dioxide pigmented gelatin coating containing 100 parts titanium dioxide, 12 parts gelatin and 6 parts glycerine. The coated paper was supercalendered and the opposite side of the paper was backcoated with 18 grams per square meter of a polyvinylidene chloride latex coating containing 55 parts polyvinylidene chloride, 5 parts titanium dioxide and 0.19 part of carbon black.

Example VI

The gray paper of Example II was coated as shown in Example V except that the backcoating was a 1 mil coating of unpigmented high density polyethylene applied by extrusion coating.

Standard diffusion transfer positive gelatin emulsion coatings were applied to both the paper bases of Example V and Example VI. The positive print papers thus produced were successfully used in combination with an opaque negative in a diffusion transfer photographic process where the development was by pod means outside the camera, i.e., in the presence of actinic light. The photographic prints produced in each case were satisfactory with no spots or blemishes due to light transmitted through the postive print paper.

Example VII

A 7.9 mil gray paper was produced using the method of Example I in which the magnesium silicate was replaced by 0.5% hydrous aluminum oxide (Alon C) and the combined filler pigments were 13.5%, both percentages based on the fiber content. The basis weight of the resultant paper was 166 grams per square meter and the paper contained 19.5 grams of filler pigments and 2.3 grams of carbon black per square meter based on the amount of these materials added. Retention of the filler was found to be in excess of 93% based on the determination of ash in the paper. Again the paper produced was uniformly gray and was found to be completely opaque.

Example VIII

A 7.7 mil gray paper was produced using the method of Example I in which the filler pigments was a combination of 7% titanium dioxide and 7% PKT pigmentary potassium titanate, based on the fiber content. The basis weight of the resultant paper was 154 grams per square meter and the paper contained 20 grams of titanium pigments and 2.2 grams of carbon black per square meter. The filler retention was in excess of 93%. The resultant gray paper was completely opaque.

A comparative opacity test was made between the paper of Example I and three papers made in the manner of Example I in which addition of (A) the hydrous magnesium silicate was omitted, (B) the titanium pigment was omitted, and (C) the carbon black was omitted. The results were as follows:

Paper from Example I—Negative clear, no black specks
Paper A (no hydrous magnesium silicate)—Many black specks
Paper B (no titanium pigment)—Many black specks
Paper C (no carbon black)—Negative darkened

We claim:

1. A gray opaque photographic paper impervious to actinic light comprising a fibrous web containing uniformly distributed therein titanium pigment particles selected from the group consisting of titanium dioxide particles, fibrous potassium titanate particles and mixtures thereof, a light absorbing colorant taken from the group consisting of water dispersible black pigments, water soluble black dyes and mixtures thereof, said titanium pigment particles and said light absorbing colorant being present in said fibrous web in amounts equivalent to 14–26 grams and 1.3–3.8 grams respectively per square meter, and a small amount of colloidal particles selected from the group consisting of colloidal hydrous magnesium silicate particles and colloidal hydrous aluminum oxide particles, said colloidal particles being present in said fibrous web in an amount approximately 1.5–15% by weight of the titanium pigment particles.

2. The paper of claim 1 in which the water dispersible black pigment is colloidal carbon black (C.I. 77266).

3. The paper of claim 1 in which the water soluble black dye is Nigrosine WSB (C.I. 50420).

4. The paper of claim 1 in which the colloidal particles are hydrous magnesium silicate particles having an average effective spherical diameter of approximately 20 millimicrons and a negative electrical charge on the particle surface.

5. The paper of claim 1 in which the colloidal particles are hydrous aluminum oxide particles having an average diameter of approximately 30 millimicrons and a positive electrical charge on the particle surface.

6. A method of producing a gray opaque photographic paper impervious to actinic light comprising the steps of preparing an aqueous suspension of refined photographic grade papermaking fibers, adding to said fiber suspension an aqueous dispersion of colloidal particles having an electrical charge on the particle surface selected from the group consisting of colloidal hydrous magnesium silicate particles and colloidal aluminum oxide particles, adding an aqueous dispersion of titanium pigment particles selected from the group consisting of titanium dioxide particles, fibrous potassium titanate particles and mixtures thereof in an amount equivalent to 14–16 grams per square meter in the finished paper, said colloidal particles being added in an amount equivalent to 1.5–15% of the amount of titanium pigment particles added, additionally adding a dispersion of a light absorbing colorant selected from the group consisting of water soluble black dyes, water dispersible black pigments and mixtures thereof in an amount equivalent to 1.3–3.8 grams per square meter in the finished paper, adjusting the resulting fiber suspension to an acid pH, forming said resulting fiber suspension into a web on a paper machine and drying said formed web.

7. The method of claim 6 in which the dispersions of colloidal particles having an electrical charge on the particle surface and titanium pigment particles are mixed together prior to adding to said fiber suspension.

8. The method of claim 6 in which the colloidal particles are hydrous magnesium silicate particles having an average effective spherical diameter of approximately 20 millimicrons and a negative electrical charge on the particle surface.

9. The method of claim 6 in which the colloidal particles are hydrous aluminum oxide particles having an average diameter of approximately 30 millimicrons and a positive electrical charge on the particle surface.

10. The method of claim 6 in which 2% starch by weight based on the dry weight of fibers was added to the fiber suspension prior to the web forming step.

11. The method of claim 6 in which the water dispersible black pigment is colloidal carbon black (C.I. 77266).

12. The method of claim 6 in which the water soluble black dye is Nigrosine WSB (C.I. 50420).

13. An opaque photographic paper base impervious to actinic light suitable for coating with a diffusion transfer positive emulsion to produce a positive print paper comprising a fibrous web containing uniformly distributed therein 14–26 grams per square meter of titanium pigment particles selected from the group consisting of titanium dioxide particles, fibrous potassium titanate particles, and mixtures thereof, 1.3–3.8 grams per square meter of a light absorbing colorant selected from the group consisting of water soluble black dyes, water dispersible black pigments and mixtures thereof, and 1.5 to 15% by weight, based on the weight of titanium pigments, of colloidal particles selected from the group consisting of colloidal hydrous magnesium silicate particles and colloidal hydrous aluminum oxide particles and having a white pigmented coating on one surface of said fibrous web.

14. The opaque photographic paper base of claim 13 having additionally a curl, water and solvent resistant coating on the surface of said paper base opposite the white pigmented coated surface.

15. The photographic paper of claim 13 in which the curl, water and solvent resistant coating is an approximately 1 mil coating of polyethylene.

16. A gray opaque photographic paper impervious to actinic light comprising a fibrous web containing uniformly distributed therein titanium dioxide particles, a light absorbing colorant taken from the group consisting of water dispersible black pigments, water soluble black dyes and mixtures thereof, said titanium dioxide particles and said light absorbing colorant being present in said fibrous web in amounts equivalent to 14–26 grams and 1.3–3.8 grams respectively per square meter, and a small amount of colloidal hydrous magnesium silicate particles having a surface electrical charge, said colloidal particles being present in said fibrous web in an amount approximately 5–15% by weight of the titanium dioxide particles.

17. The paper of claim 16 in which the water dispersible black pigment is colloidal carbon black (C.I. 77266).

18. The paper of claim 16 in which the water soluble black dye is Nigrosine WSB (C.I. 50420).

19. The paper of claim 16 in which the colloidal hydrous magnesium silicate particles have an average equivalent spherical diameter of about 20 millimicrons and a negative electrical charge on the particle surface.

20. A method of producing a gray opaque photographic paper impervious to actinic light comprising the steps of preparing an aqueous suspension of refined photographic grade papermaking fibers, adding to said fiber suspension an aqueous dispersion of colloidal hydrous magnesium silicate particles having an electrical charge on the particle surface, adding an aqueous dispersion of titanium dioxide particles in an amount equivalent to 14–26 grams per square meter in the finished paper, said colloidal particles being added in an amount equivalent to 5 to 15% of the amount of titanium dioxide particles added, additionally adding a dispersion of a light absorbing colorant taken from the group consisting of water dispersible black pigments, water soluble black dyes and mixtures thereof in an amount equivalent to 1.3–3.8 grams per square meter in the finished paper, adjusting the resulting fiber suspension to an acid pH, forming said resulting fiber suspension into a web on a paper machine and drying said formed web.

21. The method of claim 20 in which the dispersions of colloidal particles having an electrical charge on the particle surface and titanium dioxide particles are mixed together prior to adding to said fiber suspension.

22. The method of claim 20 in which the colloidal hydrous magnesium silicate particles having an average equivalent spherical diameter of about 20 millimicrons and a negative electrical charge on the particle surface.

23. The method of claim 20 in which the light absorbing colorant is a material taken from the group consisting of colloidal carbon black, Nigrosine WSB and mixtures thereof.

24. The method of claim 20 in which 2% starch by weight based on the dry weight of fibers was added to the fiber suspension prior to the web forming step.

25. An opaque photographic paper impervious to actinic light base suitable for coating with a diffusion transfer positive emulsion to produce a positive print paper comprising a fibrous web containing uniformly distributed therein 14–26 grams per square meter of titanium dioxide particles, 1.3–3.8 grams per square meter of a light absorbing colorant taken from the group consisting of water dispersible black pigments, water soluble black dyes and mixtures thereof, and 5 to 15% by weight, based on the weight of titanium dioxide, of colloidal hydrous magnesium silicate particles having a surface electrical charge and having a white pigmented coating on one surface of said fibrous web.

26. The opaque photographic paper base of claim 25 having additionally a curl, water and solvent resistant coating on the surface of said paper base opposite the white pigmented coated surface.

27. The photographic paper of claim 26 in which the curl, water and solvent resistant coating is an approximately 1 mil coating of polyethylene.

References Cited

UNITED STATES PATENTS

| | | | |
|---|---|---|---|
| 2,943,013 | 6/1960 | Arledter | 162—157 |
| 3,041,200 | 6/1962 | Steffen | 162—162 |
| 3,060,025 | 10/1962 | Burg | 96—84 R |
| 3,516,832 | 6/1970 | Earhart | 96—84 R |
| 2,113,380 | 4/1938 | Nichols | 162—162 X |
| 3,258,392 | 6/1966 | Brill | 162—162 |

FOREIGN PATENTS

| | | | |
|---|---|---|---|
| 894,572 | 4/1962 | Great Britain | 96—85 |

S. LEON BASHORE, Primary Examiner

F. FREI, Assistant Examiner

U.S. Cl. X.R.

96—84 R, 85; 162—181 B, 181 C